United States Patent Office 2,778,281
Patented Jan. 22, 1957

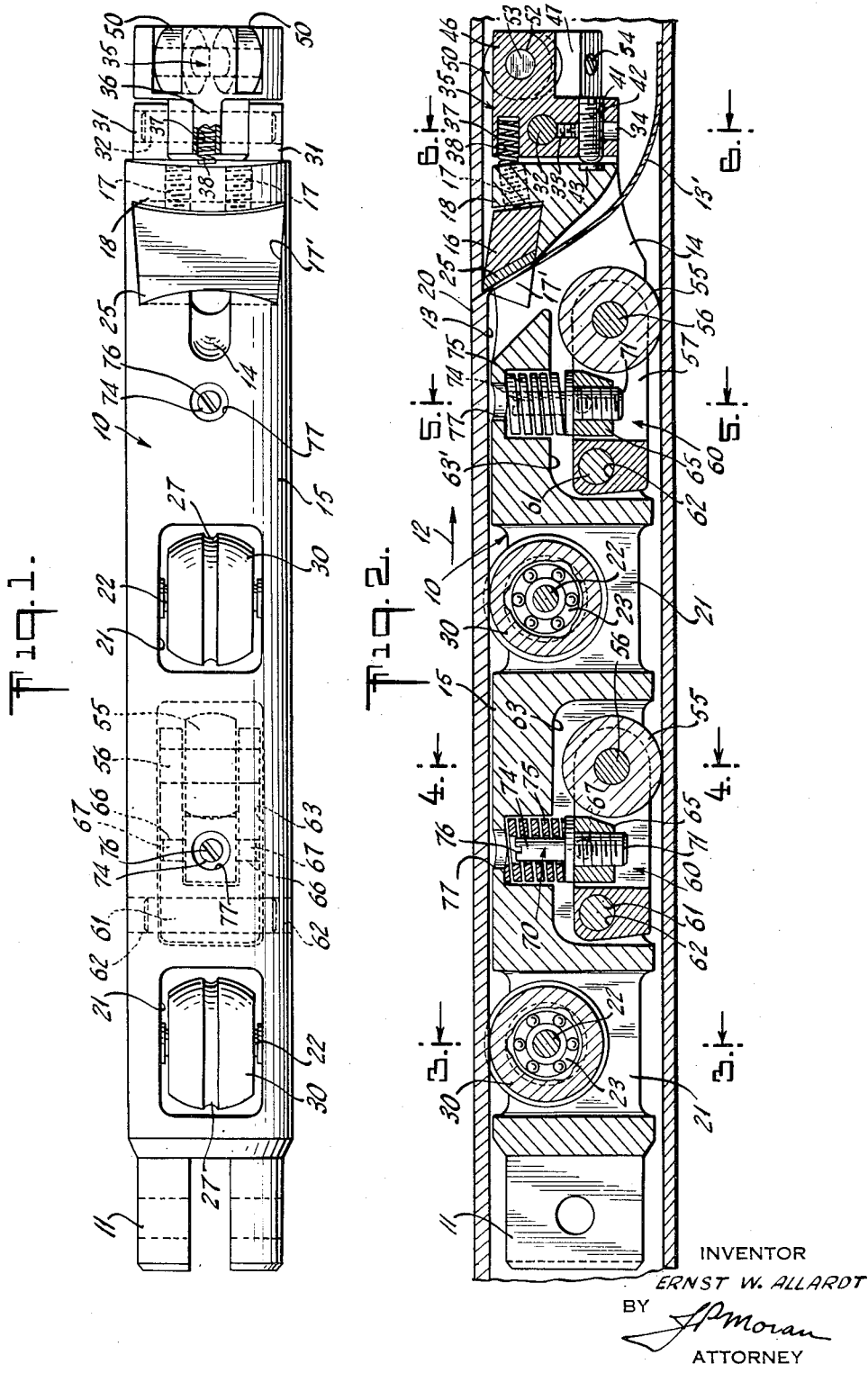

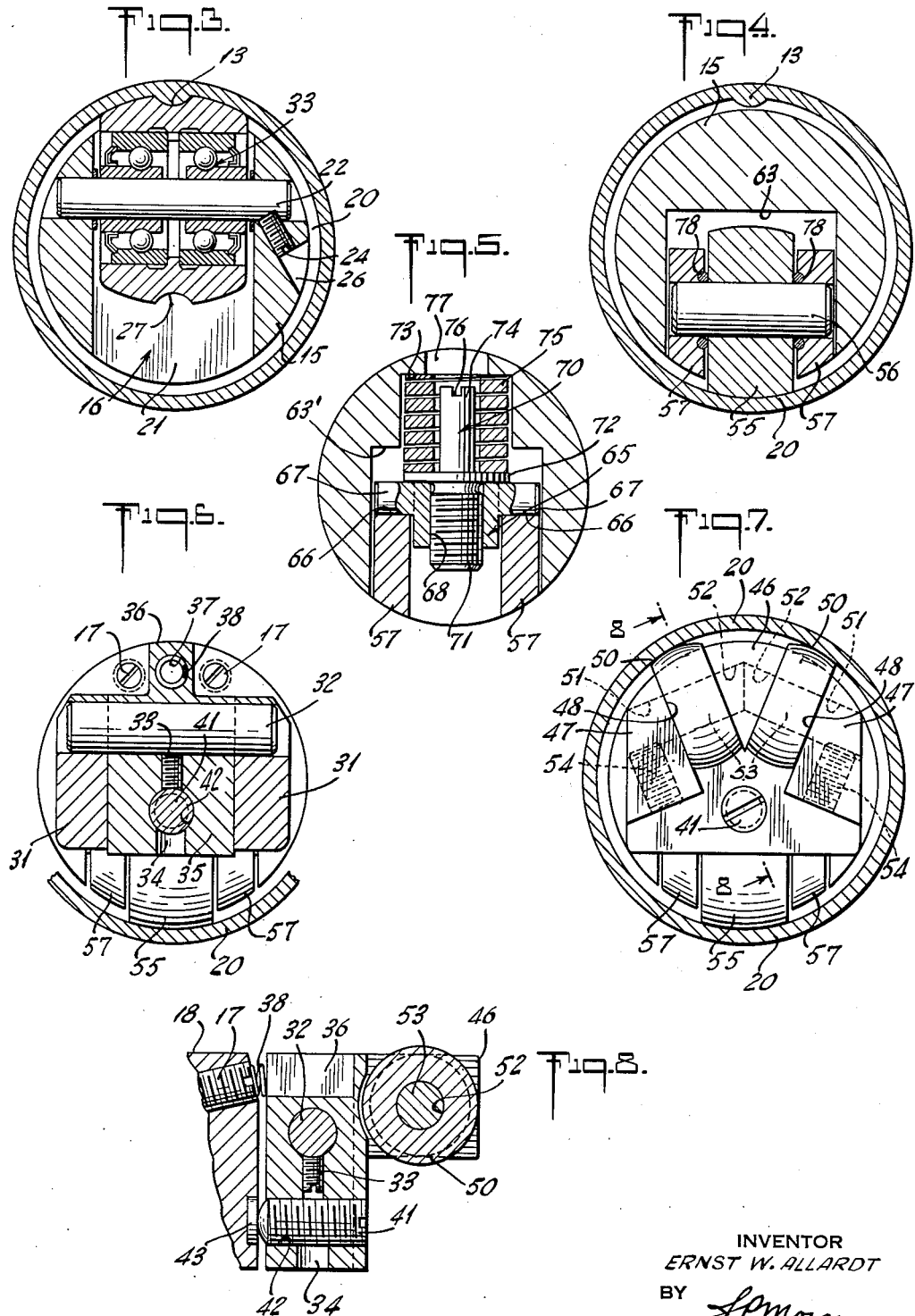

2,778,281

INSIDE BEAD TRIMMER WITH VERTICALLY ADJUSTABLE TAIL ROLLS DOWNSTREAM OF CUTTING EDGE

Ernst W. Allardt, Alliance, Ohio, assignor to The Babcock & Wilcox Company, New York, N. Y., a corporation of New Jersey Application January 9, 1953, Serial No. 330,553

8 Claims. (Cl. 90—24)

The invention relates to inside bead trimmers for resistance welded tubing and, more particularly, to a bead trimmer having improved means for accurately maintaining a bead cutting tool in pre-set cutting depth relation to the inside tube surface.

In the manufacture of resistance welded tubing, the electrically heated skelp edges are forced together to form the seam weld, and in this process, there is extrusion of metal inwardly and outwardly of the tube. This extrusion forms ridges usually known as beads, and their thickness and conformation varies with the tube size, the wall thickness and welding conditions. To make an acceptable product, these beads must be removed, and it is, in many cases, particularly important that the inside bead be accurately and completely removed so that the tubing may have a smooth cylindrical bore.

The inside bead is usually removed by a device known as an inside bead trimmer. Most frequently, such a trimmer takes the form of an elongated body arranged to fit within the formed and welded tubing and having rollers engaging the inside surface of the tubing. This trimmer is usually mounted in the tubing downstream from the welding point, and carries a hardened cutter engageable with the inside bead while the latter is still somewhat in a plastic condition. This cutter thus strips the inside bead from the inner surface of the tubing, leaving the inner surface smooth.

It is important that the depth of cut of the bead trimmer be accurately pre-set and maintained where it is desired to achieve a uniformly smooth inner surface of the tube. Various means have been proposed and tried for maintaining the cutter accurately positioned to effect the desired depth of cut, which will vary with different sizes and types of tubing, the height of the bead being dependent upon several factors such as the welding temperature, the force with which the skelp edges are pressed together, and the material of the tubing. However, in production operations, it has been found difficult to maintain the depth of cut constant, and frequently the cutting tool either cuts too deeply or not deeply enough. Having the tool cut too deeply is the more serious problem, as this results in the tube wall being unacceptably thin at the welded seam, causing rejection of the tubing. When either of the two conditions occurs, it is necessary to interrupt the forming of the tube to re-set the cutter to effect the desired depth of cut. Such interruptions are bothersome and costly.

In accordance with the present invention, a novel inside bead trimmer is provided with which the depth of cut can be accurately pre-set and constantly maintained. The invention bead trimmer comprises an elongated body having upper, longitudinally spaced supporting rollers with grooved peripheries to engage over the formed bead and guide the body therealong. Downstream from these rollers is mounted a hardened cutting tool having a rigid support in the bead trimmer body and provided with adjustment means for accurately pre-setting the depth of cut. This pre-set position of the cutting tool relative to the bead and to the inside surface of the tube is accurately maintained by a pair of vertically adjustable tail rolls or rollers mounted in the body downstream of the cutting edge and at an angle to each other to allow the welded zone of the tubing to pass between the tail rolls. Thus, these tail rolls are engaged with the tubing on surfaces which are substantially not affected by the formation of the welded seam. By accurately adjusting these tail rolls with relation to the cutting edge of the cutting tool, the top surfaces of the guide rolls, and the inner surface of the tube wall, the rigidity of the entire assembly thereby resulting will resist any force tending to pull the cutter into deeper engagement with the bead, thus accurately limiting the depth of cut. Desirably, the tail rolls and their mounting shafts are made of a hard wear-resistant nature so as to maintain the necessary continued accuracy of the assembly.

A further feature of the invention bead trimmer is the construction and mounting of the lower or bottom support rolls. Each of these rolls is mounted in a housing pivotally or hingedly supported within the bead trimmer body. Adjustable spring means are provided to urge these housings to pivot outwardly to maintain the bottom support rolls firmly against the inside surface of the tube to thereby firmly force the upper guide and tail rolls against the inside surface of the tube. To assist in assuring accurate maintenance of the depth of cut, one of these lower pressure exerting support rolls is mounted substantially in line with the cutting edge of the cutting tool. Thereby a positive force on the cutting tool is exerted directly at the cutting tool location. The lower support rolls are likewise of hard material or are hardened as are also their mounting shafts.

For an understanding of the invention principles, reference is made to the following description and the accompanying drawings.

In the drawings:

Fig. 1 is a top plan view of the invention inside bead trimmer;

Fig. 2 is a longitudinal vertical sectional view through the bead trimmer, showing it in operative relation inside welded tubing;

Figs. 3 through 6 are transverse vertical sectional views on the correspondingly numbered lines of Fig. 2;

Fig. 7 is an elevation view of the downstream or tail end of the bead trimmer; and Fig. 8 is a section on the line 8—8 of Fig. 7.

Referring to Figs. 1 and 2 of the drawings, the invention bead trimmer 10 comprises an elongated preferably cylindrical body 15 of a diameter somewhat smaller than the inside diameter of tube 20. The bead trimmer is held stationary by means of a connection to the coupling 11 at the upstream end of body 15, and the welded tube 20 moves to the right in the direction of the arrow 12. As the tube is welded along the top longitudinal seam, there remains a small flash or bead 13 extending into the tube. The part of this bead which protrudes through the tube is cut off by the cutting element or cutting tool 25 of bead trimmer 10, the severed bead portion 13' passing downwardly through an opening 14 in body 15 in advance or upstream of cutting tool 25.

Tool 25 is held in position by a supporting block 16, the tool and its supporting block being shaped to fit into a somewhat trapezoidal (in plan) recess 17' in the upper surface of body 15. A pair of adjusting screws 17 are threadedly mounted through an upright wall 18 at the downstream end of recess 17', and these screws are used to adjust the depth of cut taken by tool 25. It will be noted that the recess 17' slopes forwardly and upwardly, so that, as tool 25 is moved to the left, as seen in Fig. 2, the tool projects an increasing distance beyond the upper surface of body 15.

Referring to Figs. 1, 2 and 3, body 15 is provided with a pair of openings 21 and extending vertically therethrough, one of these openings being adjacent coupling 11 and the other being substantially midway of the length of body 15. Openings 21 act as mounting enclosures for upper guide rollers 30. Each of these rollers is rotatably mounted on shaft 22 through the medium of sealed roller bearings 23. Shaft 22 is locked against axial movement by a set screw 24 accessible through a recess 26 in the side surface of body 15. Each roller 30 is formed with a circumferential groove 27 providing guiding contact with bead 13. The rollers 30 thus act to maintain the body 15, and particularly the cutting tool 25, accurately aligned with bead 13.

Extending from the downstream end of body 15 are a pair of spaced ears 31 which receive a pintle or hinge shaft 32 for a tail roll supporting block 35. This block has a close fit between the ears 31, as best seen in Figs. 1 and 6, and a set screw 33 threaded into a vertical passage 34 intersecting the passage receiving pintle 32, locks the pintle against axial movement. Extending from the upper surface of block 35 is a rib 36 formed with a recess 37 acting as a seat for a coil spring 38 bearing against the wall 18 and tending to bias block 35 clockwise as viewed in Fig. 2. The rib 36 is relatively narrow, whereby access is provided to the cutter adjusting screw 17 located on either side of rib 36. Such clockwise movement is limited by an adjusting screw 41 threaded into a passage 42 extending lengthwise through the lower end of block 35 and substantially centrally thereof. This set screw bears against a button 43 of hard material set in a recess in the end of body 15 and coaxial with passage 42.

Projecting rearwardly from the downstream end of block 35 adjacent the upper end thereof is a rib 46 which is sector-shaped in cross-section. On either side of rib 46, and in equally spaced relation thereto, are ribs 47 which are trapezoidal in section. The inner faces 48 of ribs 47 are each parallel to a straight face of rib 46.

Passages 51 are formed through each rib 47, these passages being perpendicular to the inner faces 48 and each coaxial with one of a pair of intersecting passages 52 in the central rib 46. Each pair of passages 51—52 receives a shaft 53 of hardened or hard wear-resistant material, these shafts having bevelled inner mating ends which fit against each other in the rib 46 as best seen in Fig. 7. The shafts 53 are held in position by set screws 54 each threaded into a passage in a rib 47 intersecting the passage 51 therein. Each shaft 53 supports a tail roller 50 of hard, wear-resistant material, the angles of the shafts 53 being such that rollers 50 bear against the inner surface of the tube in equally spaced relation on either side from the weld-affected zone of the tube. The tail rolls 50 are thus rotatable in planes on opposite sides of and at equal acute angles to an axial plane including bead 13.

The body 15 of bead trimmer 10 is biased upwardly to maintain guide rollers 30, cutter 25, and tail rolls 50 firmly against the upper portion of the tubing by spring biased bottom supporting rolls 55, 55. Each bottom roll 55 is of hardened wear-resistant material and is rotatably mounted on a hard material shaft 56 mounted through the spaced parallel arms 57 of a U-shaped supporting bracket 60 hinged on a pintle 61. Pintles 61 are mounted in transverse passages 62 in the bottom 15, each intersecting a bottom opening recess 63, 63' receiving one of the bottom roll supporting assemblies.

Referring to Figs. 2 and 5, the upper surfaces of arms 57 of brackets 60 are arcuately notched, as at 66, to cooperatively receive a bridge member 65 having trunnions 67 lying in the notches 66. Each bridging member 65 has a threaded passage 68 extending upwardly therethrough and adjustably receiving a threaded stud 71 on a spring seat 70. Spring seat 70 includes a circular flange 72 forming a seat for a coil spring 75 seated in a recess 73 opening downwardly into each roller assembly recess 63 or 63'. An upwardly extending pin 74 on each spring seat 70 centers the coil spring 75 thereon, and the upper end of each pin 74 has a kerf 76 therein accessible through an opening 77 in the upper surface of body 15. Thereby, the compression of each spring 75 may be readily and easily adjusted by threading studs 71 along threaded passages 68.

To pre-set the desired depth of cut, the springs 75 are first adjusted to give the desired degree of upward thrust to the body 15, and screws 17 are adjusted to project cutter 25 the desired distance beyond the periphery of body 15. The adjusting screw 41 is then turned to accurately set the position of tail rolls 50 with respect to the upper edge of cutter 25 and with respect to the surfaces of guiding rollers 30 so that firm engagement of the guiding rollers 30 and the tail rolls 50 with the inner surface of tubing 20 will prevent cutter 25 taking too deep a cut as it removes or severs the bead 13. Assurance that the cut will be deep enough is provided by proper adjustment of the force of springs 75 biasing bottom rollers 55 downwardly.

It will be noted that one of the recesses 63, for the bottom roller assemblies is located between the recesses 21, 21' for the guide rolls 30, the other recess 63' is so located that its associated bottom roller 55 is aligned substantially directly beneath the cutting edge of tool 25, as may be best seen in Fig. 2 so that a directly upward thrust is provided substantially in alignment with the cutting edge of the tool. This further assures positive and accurate engagement of the cutter edge with the bead and to the desired depth of cut. Assurance of continued maintenance of the required depth of cut is further provided by making the tail rolls 50, the bottom support rolls 55, and the supporting shafts for these rolls of hardened, wear-resistant material. Protection of the bottom rolls 55 against foreign material entering into the shaft assembly is provided by seals 78 between each bottom roll 55 and the associated bracket arms 57.

While a specific embodiment of the invention has been shown and described in detail to illustrate the application of the invention principles, it will be understood that the invention may be embodied otherwise without departing from such principles.

What is claimed is:

1. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting therebeyond; roller means mounted in said body and engageable with the inner surface of the tube to maintain said cutter engaged with the bead; a pair of tail rolls adjustably and rotatably mounted on said body downstream of the cutter in laterally spaced relation to each other for engagement with the tube on either side of the weld-affected zone thereof; and means operable to adjust and maintain rigidly the position of said tail rolls relative to said body and cutter to accurately maintain a pre-set depth of cut.

2. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting therebeyond; roller means mounted in said body and engageable with the inner surface of the tube to maintain said cutter engaged with the bead; a pair of tail rolls adjustably and rotatably mounted on said body downstream of the cutter said tail rolls being rotatable in planes on opposite sides of and at equal acute angles to a plane passing through the longitudinal axis of the tube and through the bead for engagement with the tube on either side of the weld-affected zone thereof; and means operable to adjust and maintain rigidly the position of said tail rolls relative to said body and cutter to accurately maintain a pre-set depth of cut.

3. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting therebeyond; roller means mounted in said body and engageable with the inner surface of the tube to maintain said cutter engaged with the bead; a support pivotally mounted on said body immediately downstream from said cutter for swinging movement in a plane passing through the longitudinal axis of the tube and through the bead; a pair of tail rolls rotatably mounted on and projecting from said support toward the tube surface in laterally spaced relation to each other for engagement with the tube on either side of the weld-affected zone thereof; means biasing said support to swing away from the bead; and means rigidly limiting movement of said support in a direction away from the bead to accurately maintain a pre-set depth of cut.

4. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting upwardly therebeyond; longitudinally spaced first guide rolls mounted in said body upstream of said cutter for rotation in a plane passing through the longitudinal axis of the tube and through the bead and each projecting upwardly from the body and having a circumferentially grooved periphery for engagement with the tube on each side of the bead to align said cutter with the bead; a pair of tail rolls rotatably mounted on said body downstream of the cutter in laterally spaced relation to each other for engagement with the tube on either side of the weld-affected zone thereof; longitudinally spaced second guide rolls mounted in said body upstream of said cutter for rotation in an axial plane including the bead and each arranged to project downwardly from said body into engagement with the tube; means biasing said second guide rolls outwardly from said body to bias said body toward the bead to maintain said first guide rolls and said tail rolls firmly engage with the tube surface adjacent the bead; and means operable to adjust and maintain rigidly the position of said tail rolls relative to said body and cutter to accurately maintain a pre-set depth of cut.

5. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting upwardly therebeyond; longitudinally spaced first guide rolls mounted in said body upstream of said cutter for rotation in a plane passing through the longitudinal axis of the tube and through the bead and each projecting upwardly from the body and having a circumferentially grooved periphery for engagement with the tube on each side of the bead to align said cutter with the bead; a pair of tail rolls rotatably mounted on said body downstream of the cutter in laterally spaced relation to each other for engagement with the tube on either side of the weld-affected zone thereof; longitudinally spaced second guide rolls mounted in said body upstream of said cutter for rotation in an axial plane including the bead and each arranged to project downwardly from said body into engagement with the tube; means biasing said second guide rolls outwardly from said body to bias said body toward the bead to maintain said first guide rolls and said tail rolls firmly engaged with the tube surface adjacent the bead; and means operable to adjust and maintain rigidly the position of said tail rolls relative to said body and cutter to accurately maintain a pre-set depth of cut; one of said second guide rolls engaging the tube substantially directly beneath the cutting edge of said cutter.

6. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting upwardly therebeyond; longitudinally spaced first guide rolls mounted in said body upstream of said cutter for rotation in a plane passing through the longitudinal axis of the tube and through the bead and each projecting upwardly from the body and having a circumferentially grooved periphery for engagement with the tube on each side of the bead to align said cutter with the bead; longitudinally spaced recesses opening outwardly from the bottom surface of said body upstream of said cutter; a forked bracket hingedly mounted in each recess; a second guide roll rotatably mounted in the forked free end of each bracket and each arranged to project downwardly from said body into engagement with the tube; and means biasing the free end of each bracket outwardly from said body to bias said body toward the bead to maintain said first guide rolls firmly engaged with the tube surface adjacent the bead.

7. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting upwardly therebeyond; longitudinally spaced first guide rolls mounted in said body upstream of said cutter for rotation in a plane passing through the longitudinal axis of the tube and through the bead and each projecting upwardly from the body and having a circumferentially grooved periphery for engagement with the tube on each side of the bead to align said cutter with the bead; longitudinally spaced recesses opening outwardly from the bottom surface of said body upstream of said cutter; a forked bracket hingedly mounted in each recess; a second guide roll rotatably mounted in the forked free end of each bracket and each arranged to project downwardly from said body into engagement with the tube; and means biasing the free end of each bracket outwardly from said body to bias said body toward the bead to maintain said first guide rolls firmly engaged with the tube surface adjacent the bead; one of said second guide rolls engaging the tube substantially directly beneath the cutting edge of said cutter.

8. An inside bead trimmer for severing a bead from the inner surface of a welded tube, said bead trimmer comprising an elongated body adapted to be disposed within the tube so as to permit relative longitudinal motion between the tube and the body; a bead cutter normally fixed to the body and having a cutting edge projecting upwardly therebeyond; means operably associated with said cutter and said body to adjust the relative position of said cutting edge to pre-set the depth of cut; a part of said body forming a severed bead passage adjacent said cutter; longitudinally spaced first guide rolls mounted in said body upstream of said cutter for rotation in an axial plane including the bead and each projecting upwardly from the body and having a circumferentially grooved periphery for engagement with the tube on each side of the bead to align said cutter with the bead; a support pivotally mounted on said body immediately downstream from said cutter for swinging movement in a plane passing through the longitudinal axis of the tube and through the bead; a pair of tail rolls rotatably mounted on and projecting from said support toward the tube surface and rotatable in planes on opposite sides of and at equal acute angles to an axial plane including the bead for engagement with the tube on either side of the weld-affected zone thereof; means biasing said support to swing away from the bead; adjustable means rigidly limiting movement of said support in a direction away from the bead to accurately maintain a pre-set depth of cut; longitudinally spaced recesses opening outwardly from the bottom surface of said body upstream of said cutter; a forked bracket hingedly mounted in each recess; a second guide roll rotatably mounted in the forked free end of each bracket and each arranged to project downwardly from said body into engagement with the tube; and adjustable means biasing the free end of each bracket outwardly from said body to bias said body toward the bead to maintain said first guide rolls firmly engaged with the tube surface adjacent the bead; one of said second guide rolls engaging the tube substantially directly beneath the cutting edge of said cutter.

References Cited in the file of this patent

UNITED STATES PATENTS

| | | |
|---|---|---|
| 1,912,419 | Whitman | June 9, 1933 |
| 2,025,422 | Park | Dec. 24, 1935 |
| 2,237,550 | Darner | Apr. 8, 1941 |
| 2,286,513 | Sower | June 16, 1942 |
| 2,573,295 | Allardt | Oct. 30, 1951 |